Dec. 17, 1940.   E. O. VOIGTLAENDER ET AL   2,225,283
HEAT EXCHANGE APPARATUS
Filed Nov. 4, 1937   2 Sheets-Sheet 1
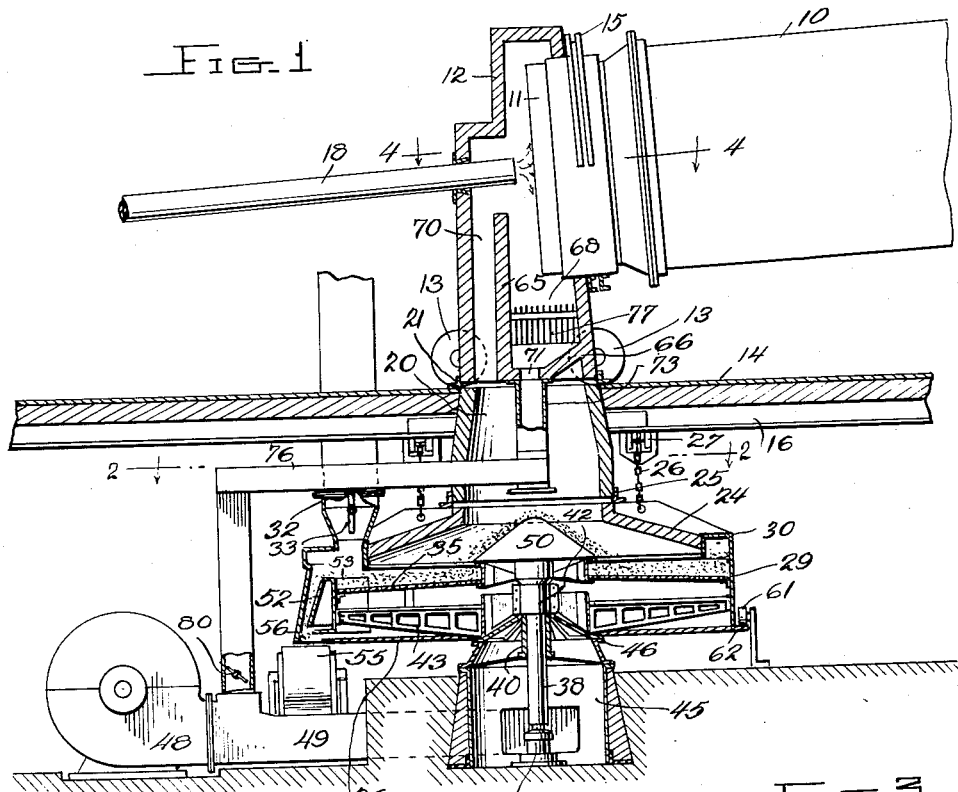
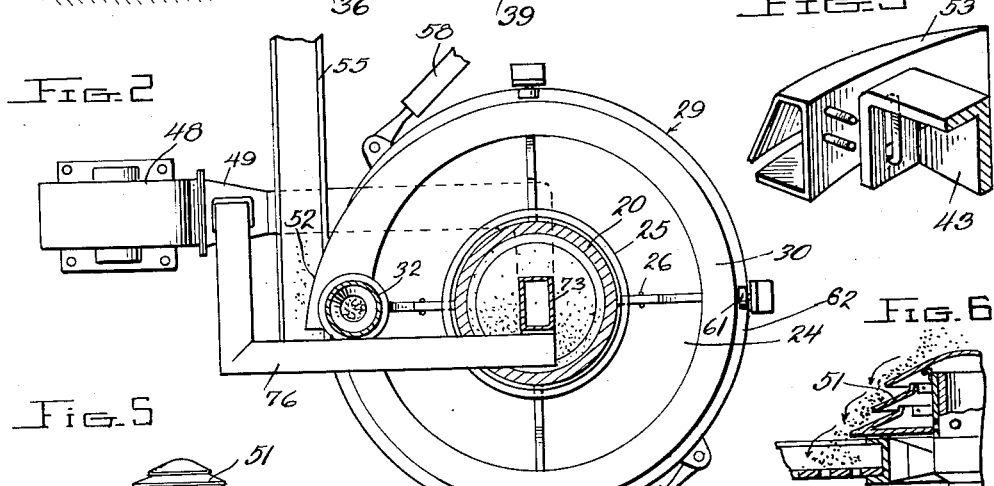
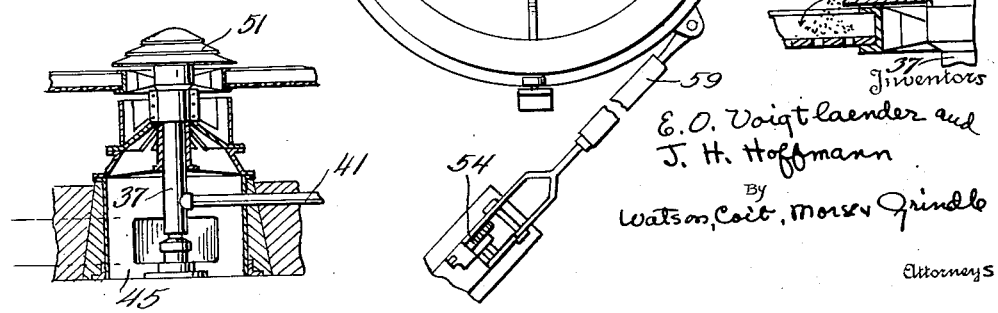

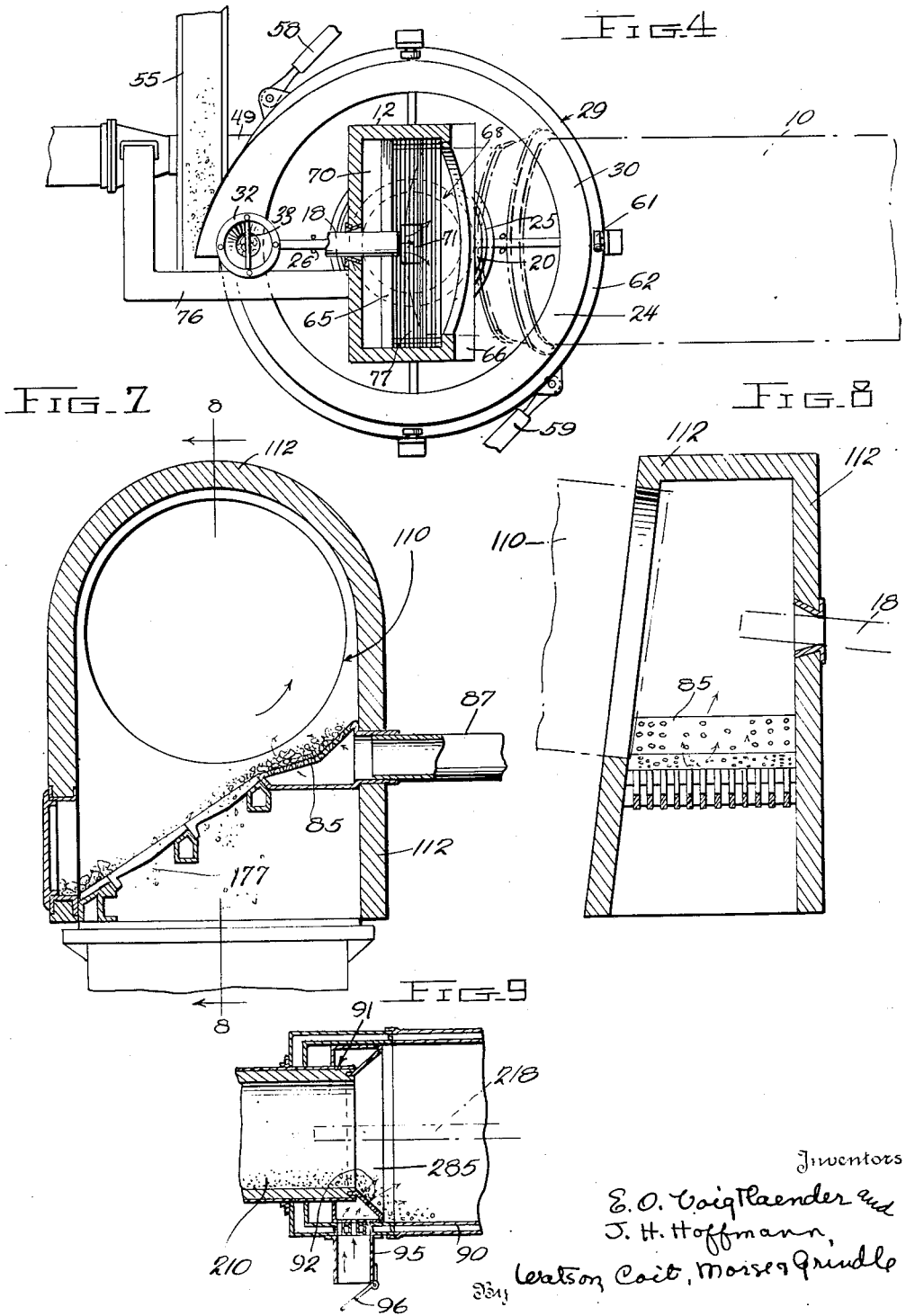

Patented Dec. 17, 1940

2,225,283

UNITED STATES PATENT OFFICE 2,225,283

HEAT EXCHANGE APPARATUS

Erich Otto Voigtlaender and Joseph H. Hoffmann, Bethlehem, Pa.

Application November 4, 1937, Serial No. 172,804

10 Claims. (Cl. 263—36)

This invention relates to the production of cement and similar materials and has for its principal object the provision of apparatus for use with a cement kiln or furnace to effectively and inexpensively cool the kiln product and to improve the efficiency of the kiln.

It is common practice in the production of cement by the burning of the raw cement material in a kiln to employ a cooler into which the cement clinker is introduced as it discharges from the kiln, the clinker being thus brought to a reduced temperature suitable for the grinding or pulverizing operation. For this purpose air is passed through the cooler in intimate contact with the clinker, and since the air thereby acquires a high temperature, it is ordinarily delivered from the cooler into the kiln to aid in the combustion, the efficiency of the kiln being thus increased by the use of preheated air. It is also conventional practice to employ in such coolers the counterflow principle, the current of air in the cooler moving from the clinker discharge end to the clinker inlet end of the cooler, whereby as the air becomes heated to higher temperatures it is progressively contacted with clinker of higher temperature, the principle and advantages of such a process being well-known and frequently utilized in heat exchange devices of widely varying nature and purpose. However, the application of the counterflow principle to the cooling of cement clinker, while effecting most efficient cooling from the standpoint of heat exchange economy, does not result in the production of clinker in a form in which it can be most effectively ground or pulverized. Thus it is found that rapid and sudden quenching of the clinker from the maximum temperature acquired thereby effects some desirable change in the clinker structure which facilitates subsequent grinding, resulting in a more uniformly ground product and reducing the power required for the operation of the grinding apparatus and consequently the expense. Possibly this rapid quenching results in some form of crystallization of the clinker structure whereby it is rendered more friable. Of course, this rapid quenching cannot be effected by employment of the counterflow principle, since the clinker delivered to the cooler first encounters the relatively hot air which has absorbed heat from passage through the cooler, and the clinker is not contacted with unheated air until it reaches the discharge end of the cooler, the cooling of the clinker being quite gradual.

It is therefore proposed as part of the present invention to deliver clinker directly from the kiln to the cooler and to cause cool air to contact the clinker shortly after discharge from the kiln, whereby the quenching of the clinker may be effected rapidly from the maximum temperature attained by the clinker, and the aforesaid advantages attained.

In the preferred form of the invention, the cooler is of the general type disclosed in the patent to Lellep No. 2,024,934, granted December 17, 1935, in which an oscillating grate supports the clinker, the cooler being disposed beneath the discharge end of the kiln so that the clinker may fall from the kiln into the cooler. During the course of discharge of clinker from the kiln into the cooler, a blast of cold air is directed against the clinker, and the arrangement is preferably such that this blast of air passes completely through the falling clinker to ensure intimate and thorough engagement between the entire mass of clinker and the air. The fall of the clinker may be retarded if desired to ensure lapse of sufficient time to complete the quenching of the clinker from the maximum temperature as it emerges from the kiln to the minimum temperature necessary to effect the desired physical change in the clinker. The air which is employed for quenching is, as the result of contact with the hot clinker, heated to a temperature sufficiently high for efficient use in the kiln, and is introduced therein to aid in the combustion.

After the quenching operation the temperature of the clinker is further reduced in the cooler by passage of air therethrough, and this air, thus heated, is also employed to support combustion in the kiln. As a further feature of the invention, the air from the cooler is caused to flow into close proximity to the kiln burner and the flame which emerges therefrom. It has been found that by directing the hot air adjacent the burner flame, much more efficient combustion occurs and the formation of a sheath of cool air about the flame, frequently resulting in the burning of the fuel at some distance from the burner nozzle, is avoided.

It is a further object of the invention to provide means whereby the amount of air employed for quenching can be altered with respect to the amount employed for the final cooling of the clinker without material alteration of the total quantity of preheated air supplied to the kiln, whereby the clinker can be most efficiently quenched and cooled without affecting combustion within the kiln, which of course proceeds independently of treatment of the clinker after discharge from the kiln.

Further objects and features of the invention will be apparent from the following description taken in connection with the accompanying drawings, in which Figure 1 is a vertical section through a cooler embodying the principles of the invention, illustrating one method of connecting the cooler with a rotary kiln;

Figure 2 is a horizontal sectional view taken substantially on the line 2—2 of Figure 1;

Figure 3 is an enlarged perspective view of a detail shown in Figure 1;

Figure 4 is a horizontal sectional view taken substantially on the line 4—4 of Figure 1;

Figure 5 is a vertical sectional view corresponding to a portion of the structure shown in Figure 1 but illustrating a modified form of the invention, certain of the parts being shown in elevation;

Figure 6 is a vertical sectional view of a part of the structure shown in Figure 5;

Figure 7 is a vertical sectional view illustrating a modified arrangement for quenching the clinker as it emerges from the kiln;

Figure 8 is a sectional view taken substantially on the line 8—8 of Figure 7; and Figure 9 is a sectional view of a further modified form of quenching device illustrating the application of the principles of the invention to a cooler of the rotary drum type.

In order to facilitate an understanding of the invention, the several embodiments thereof illustrated in the drawings are described in detail hereinafter. It will nevertheless be understood that no limitation of the scope of the invention by reason of the employment of specific language in describing these embodiments is intended. Various further modifications of the illustrated structures are contemplated such as would normally occur to one skilled in the art to which the invention relates.

Dealing first with the embodiment of the invention shown in Figures 1 to 4 inclusive, it will be observed that the kiln 10 selected for the purpose of illustration is of the rotary type. The discharge end 11 of the kiln projects within a housing 12 which is normally stationary but which may be supported by rollers 13 on a track 14 carried on a stationary framework, indicated generally at 16, so that the housing 12 may be displaced from the discharge end 11 of the kiln to permit access to the kiln interior. Suitable sealing means 15 to prevent escape of heated air or infiltration of cooled outside air is provided between the kiln and the housing 12. A burner nozzle 18, which may be supplied with powdered fuel and primary air for combustion of the fuel extends through a wall of the housing 12 and into close proximity to the discharge end of the kiln to maintain combustion within the latter. The details of the structure thus far described are largely conventional and may obviously be modified as desired.

Immediately beneath the housing 12 and communicating therewith is a chamber 20 which constitutes an enlarged vertical passage to permit upward flow of heated air toward and into the kiln, this chamber being normally stationary and being supported in any desired manner on the stationary framework 16. Conventional sealing means 21 is provided between the chamber 20 and the housing 12 to prevent the escape of heated gas or infiltration of cooled outside air. Immediately beneath the chamber 20 and in communication therewith is a hood member 24 which may be of generally conical shape, sealing means 25 being provided between the hood member and the lower end of the chamber 20. The hood member 24 is preferably displaceable laterally of the chamber 20 and the cooler which is disposed beneath the same to permit access to the cooler, and for this purpose may be suspended by chains or links 26 from rollers 27 which in turn engage with tracks carried by the stationary framework 16.

Immediately beneath the hood member 24 is the clinker cooler which as illustrated comprises a generally cylindrical outer casing or drum 29, the upper end of this drum being in open communication with the lower end of the hood member 24. The upper end of the drum 29 also communicates, adjacent its periphery, with a generally annular chamber 30, the latter in turn communicating with a vent stack 32 in which is located a gate valve 33 for controlling the discharge of heated gas therethrough. It will be observed that the major portion of the hot gases within the drum 29 will pass upwardly beneath the hood 24, into the chamber 20, and thence into the housing 12. Some portion of the hot gases within the drum 29, depending upon the position of the valve 33, will pass into the annular chamber 30 and thence to the stack 32.

Supported in any convenient manner within the drum 29 and rigidly connected therewith is a grate 35 which may comprise a perforated, generally circular disc of metal or other suitable material. The grate 35 is disposed in general parallelism to and in spaced relation with the bottom plate 36 of the drum, and the drum and grate are supported for unitary oscillatory movement about a central axis. Thus a vertical shaft 38, supported at its lower end in a thrust bearing 39 and substantially midway of its length by a stationary rotary bearing 40, may serve to carry the entire weight of the drum, the grate, and the associated elements. The supporting structure for the drum and grate may include a hub means indicated generally at 42 and radiating structural supports 43 secured at their inner ends to the hub means and at their outer ends to the peripheral wall of the drum 29. The thrust bearing 39 and the lower end of the shaft 38 are disposed within a chamber 45 which is in communication with a central opening in the bottom plate 36 of the cooler, suitable sealing means 46 being provided to afford an airtight connection therebetween. A blower 48 is connected by means of a conduit 49 with the chamber 45, this blower serving to force cool air under pressure into the chamber and thence into the drum 29 beneath the grate 35, this air passing upwardly through the grate and through the clinker thereon and thence into the kiln and stack 32 as hereinbefore explained. Adjacent its upper end the shaft 38 is provided with a dome or generally conical shaped projection 50 which may be formed of steel covered with concrete or other heat resistant material, this projection serving to deflect clinker falling from the kiln laterally onto the grate 35 and to prevent clinker or dust carried therewith from discharging downwardly onto the bearings for the shaft 38 and into the chamber 45.

The major portion of the periphery of the grate 35 is secured to and fits snugly against the circumferential wall of the drum 29, one portion of this wall being flared outwardly as indicated at 52 to afford an opening through which clinker can be discharged from the grate. Immediately adjacent this opening there is provided a movable gate indicated at 53 and illustrated more particularly in Figure 3 of the drawing, this gate being secured to an adjacent structural support 43, preferably so as to be vertically adjustable, and extending above the upper surface of the grate 35. Consequently a layer of clinker is always maintained on the grate 35 to protect the same from damage by heat, and the depth of the layer so maintained can be controlled by adjustment of the gate 53. Clinker discharged over the gate 53 falls downwardly between crushing rollers 55 or, alternatively, may be conveyed away for treatment elsewhere. Fine particles of dust falling through the grate 35 are delivered onto the bottom plate 36 of the drum 29 and are discharged through the opening 56 for treatment with the clinker.

The drum 29 is oscillated by means of a link 59 which may be secured to the peripheral portion of the drum, oscillation being effected in any desired manner, for instance by means of a motor driven crank 54 secured to the link. A second link 58 may be connected to a suitable shock absorbing device provided with springs or the like to cushion reciprocating movements of the drum. Stationary rollers 61 engaging with a flange 62 formed on the drum 29 afford an additional support for the latter.

As the result of the oscillating movement imparted to the drum, clinker falling on the grate 35 is caused to move from the center of the grate toward the periphery thereof in a generally spiral path. Similarly the dust and small particles falling through the grate onto the bottom 36 of the drum are moved outwardly thereon. The time required for the clinker to complete this movement and to discharge from the grate is sufficient to effect reduction of the temperature of the clinker to that which is most efficient for subsequent grinding or other treatment and the amount of cooling air passing through the clinker may be regulated by control of the depth of clinker on the grate 35, as hereinbefore pointed out. Air which flows through the grate adjacent the periphery of the latter is raised to a less temperature than that which contacts the hotter clinker near the center of the grate. This relatively cooler air, which is discharged through the stack 32 in the proportion desired, may be utilized for any desired purpose or vented to the atmosphere. The remainder of the heated air after passage through the clinker is directed upwardly and preferably enters the kiln adjacent the kiln burner and flame. Thus the housing 12 may be provided with a transverse partition 65 extending entirely across the housing, this partition in conjunction with a transversely extending wall 66 forming a chamber 68 into which clinker is delivered from the discharge end of the kiln. A vertical passage 70 is thus formed within the housing 12, the upper end of this passage being disposed in close proximity to the burner nozzle 18, so that the highly heated air from the cooler enters the kiln with and about the flame from the burner, with the attendant advantages hereinbefore outlined.

The wall 66, which with the partition 65 defines the chamber 68 for the reception of clinker, is provided with an opening 71 through which the clinker may be discharged, the wall 66 being preferably inclined toward this opening so as to facilitate such discharge. From the opening 71 the clinker falls through a downwardly directed conduit 73 and is discharged from the lower end of the conduit onto the projection 50 and thence to the grate 35 as hereinbefore described. Communicating with the discharge conduit 73 is a conduit 76 which is in turn in communication with the blower 48, whereby cold air is forced into the conduit 73 to quench the clinker falling therethrough from the maximum temperature acquired in the kiln. As this cold air meets the clinker it becomes rapidly heated and expands, and the upward velocity of the air within the conduit 73 is thereby tremendously increased. Consequently the fall of the clinker through the conduit 73 is more or less cushioned with the result that intimate contact is afforded between the incoming air and the clinker and the efficiency of the quenching operation accordingly enhanced.

A grate 77, which may be constituted by a series of spaced bars, is preferably disposed within the chamber 68, this grate being inclined downwardly toward one wall of the housing 12. An opening is provided in this wall adjacent the lower end of the grate and a door normally closes the opening. This door may be occasionally opened to permit the removal of clinker of such excessively large size that it will not pass through the grate, which large clinker may be broken up.

A damper 80 is preferably provided in the conduit 76 which supplies air for quenching. It will be observed that by control of this damper the proportion of quenching air which is introduced into the system can be regulated without substantially altering the amount of air supplied to the kiln for secondary combustion. The total quantity of secondary combustion air can of course be regulated by controlling the rate of operation of the blower 48 or by a damper associated therewith.

Figures 5 and 6 illustrate a modified form of the construction just described which differs therefrom principally in that the dome 50 is replaced by a dome 51 which is formed of a series of separate elements as shown more particularly in Figure 6 to permit passage of air therethrough. The supporting shaft for the grate, indicated at 37, is hollow and a conduit 41 communicates with the interior of the shaft, this conduit being connected to a source of air under pressure, the pressure being preferably considerably greater than that which is supplied to the chamber 45 which supplies air to the space beneath the grate. The air passing upwardly through the hollow shaft 37 is forced laterally between the several elements which constitute the dome 51, and clinker falling on the dome is effectively quenched from its maximum temperature. It will be appreciated that in this form of the invention it is not necessary to employ the conduits 76 and 73 shown in Figure 1 for the purpose of quenching the clinker, but the construction is otherwise preferably similar to that hereinbefore described. The several elements constituting the dome 51 are preferably so overlapped as to prevent the discharge of clinker therebetween, and the supporting bearings for the grate are thus kept free of clinker and dust as in the preceding form of the invention.

Turning now to the form of the invention shown in Figure 7 of the drawings, it will be observed that only the upper end of the apparatus immediately adjacent the discharge end of the kiln is illustrated, it being understood that the cooler may be constructed as shown in Figures 1 to 4 inclusive or in any conventional manner. In this construction the kiln 110 extends into a housing 112. A grate 177, functioning similarly to the grate 77 hereinbefore described, extends across a portion only of the width of the housing 112, the bars of this grate being spaced sufficiently to permit clinker of suitable dimensions to be discharged through the lower end of the housing 112 and thence to the cooler. Extending across the remainder of the width of the housing 112 is a grate 85 on which the major portion of the clinker is discharged immediately on leaving the kiln 110, the direction of rotation of the kiln being that indicated in Figure 7. The grate 85 is preferably inclined toward the grate 177 but the inclination is preferably fairly small so that a certain quantity of clinker will always be retained on the grate 85 to protect the same against damage by heat. Communicating with the underside of the grate 85 is a conduit 87 through which may be delivered a blast of cold air, which air passes through the clinker on the grate and is thence discharged into the kiln 110 for use as secondary combustion air.

It will be observed that by means of this construction the fall of clinker from the kiln into the cooler is momentarily retarded, whereby effective quenching of the clinker can be completed immediately on discharge from the kiln, the quenched clinker falling from the grate 85 being discharged downwardly through the bars of the grate 177.

In Figure 9 of the drawings is shown a modified embodiment of the invention illustrating the application thereof to the rotary type of cooler. In this construction the discharge end of the kiln 210, within which combustion is maintained by fuel introduced through the burner nozzle 218, extends within the inlet end 91 of a rotary cooler, this end being stationary and being in open communication with the rotating body of the cooler 90. The stationary portion 91 of the cooler and the main drum 90 are suitably sealed to prevent discharge of air therebetween while permitting rotation of the drum.

Secured within the end portion 91 of the cooler is an annular, generally conical flange 285 which is perforated at its lower side only to form in effect an equivalent of the grate 85 shown in Figures 7 and 8, this flange being secured to the stationary end portion 91 of the cooler. At the lower side of the stationary end portion 91 of the cooler is a stationary duct 95 controlled by a damper 96, this duct communicating at one end with the atmosphere and at the other end with the openings 92 in the flange 285. It will be observed that by means of this construction air is admitted to the cooler immediately below the flange 285 and passes through the openings in this flange and through the clinker as the latter discharges across the flange and into the main rotary body of the cooler, thereby effecting the desired quenching. Under some conditions it may be preferable to form this flange 285 with a relatively small angle of inclination to the horizontal so that discharge of clinker across the same will be retarded sufficiently to permit intimate and somewhat prolonged contact of the clinker with the quenching air. The damper 96 may be loaded, for instance by means of weights or a suitable spring, whereby it is normally maintained in an open position. As the velocity of air flowing through the duct and past the damper 96 increases, the damper will tend to swing inwardly and will thus exert a throttling action. Consequently the amount of air employed for quenching may be automatically regulated so that a varying amount of clinker on the flange 285 will not materially affect the quantity of air flowing through the duct 95 and into the kiln and thereby adversely affect the kiln operation. The stationary end portion 91 of the cooler is preferably suitably sealed to the kiln 210 to prevent the discharge of air other than through the perforations in the flange 285.

It will be understood that where cement or cement raw material is referred to herein, such terms are intended to comprehend materials of a similar nature capable of improvement by the apparatus and process described and claimed herein.

Having thus described the invention, what is claimed as new and desired to be secured by Letters Patent is:

1. The combination with a kiln for burning cement material to form cement clinker, of a cooler receiving clinker from said kiln, means for contacting air with the clinker in said cooler to reduce the temperature of the clinker, means for conducting clinker from said kiln to said cooler, and means associated with said last named means for causing cool air to contact with and rapidly quench the clinker from the maximum temperature after discharge of clinker from the kiln and before the clinker is received by the cooler.

2. The combination with a kiln for burning cement material to form cement clinker, of a cooler receiving clinker from said kiln, means for contacting air with the clinker in said cooler to reduce the temperature of the clinker, means for conducting clinker from said kiln to said cooler, means associated with said last named means for causing cool air to contact with and rapidly quench the clinker from the maximum temperature after discharge of clinker from the kiln and before the clinker is received by the cooler, said quenching means including a passage affording communication between said kiln and said cooler, and means for introducing cool air into said passage.

3. The combination with a kiln for burning cement material to form cement clinker, of a cooler receiving clinker from said kiln, means for contacting air with the clinker in said cooler to reduce the temperature of the clinker, means for conducting clinker from said kiln to said cooler, and means associated with said last named means for causing cool air to contact with and rapidly quench the clinker from the maximum temperature after discharge of clinker from the kiln and before the clinker is received by the cooler, said quenching means including a generally downwardly directed passage through which the clinker is discharged from the kiln, and means for introducing cool air into said passage at a point beneath the upper end thereof.

4. The combination with a kiln for burning cement material to form cement clinker, of a cooler receiving clinker from said kiln, means for contacting air with the clinker in said cooler to reduce the temperature of the clinker, means for conducting clinker from said kiln to said cooler, means associated with said last named means for causing cool air to contact with and rapidly quench the clinker from the maximum temperature after discharge of clinker from the kiln and before the clinker is received by the cooler, a blower supplying air to said cooler and said quenching means, and means for regulating the proportion of the air delivered by the blower for quenching.

5. In apparatus for cooling granular material, the combination with a generally horizontal grate receiving the material, of means for imparting an oscillatory motion to said grate to cause the material to move outwardly thereon in a generally spiral path, means associated with the peripheral portion of the grate to maintain thereon a bed of material, said means being constructed and arranged to afford an outlet for discharge of material from the grate periphery, and adjustable means associated with said outlet for controlling the depth of said outlet, whereby the thickness of the bed may be regulated.

6. The combination with a kiln for burning cement material to form cement clinker, of a cooler receiving clinker from said kiln, means for contacting air with the clinker in said cooler to reduce the temperature of the clinker, means for conducting clinker from said kiln to said cooler, and means associated with said last named means for causing cool air to contact with and rapidly quench the clinker from the maximum temperature after discharge of clinker from the kiln and before the clinker is received by the cooler, said last named means including an inclined grate over which the clinker is discharged from said kiln, and means for causing quenching air to flow through said grate and the clinker.

7. In heat exchange apparatus, the combination with a kiln, of a cooler receiving the kiln product, means for contacting air with the kiln product in said cooler to lower the temperature of the product, means for conveying the air thus contacted with the product into the kiln, a separate passage for the delivery of the product from the kiln to the cooler, and means for causing cool air to flow within said passage and into said kiln.

8. The combination with a kiln for burning cement material to form cement clinker, of a cooler receiving clinker from said kiln, said cooler including an air pervious support for the clinker, means for imparting rotational movement to said support to cause the clinker to move outwardly thereon, means adjacent the central portion of said support for receiving the clinker from the kiln, and means for causing cool air under pressure to flow through said last named means and the freshly received clinker to quench the latter and for causing air under less pressure to flow through said support and the clinker thereon.

9. The combination with a kiln for burning cement material to form cement clinker, of a cooler receiving clinker from said kiln, said cooler including an air pervious support for the clinker, means for imparting rotational movement to said support to cause the clinker to move outwardly thereon, means adjacent the central portion of said support for receiving the clinker from the kiln and deflecting the clinker laterally onto said support, said means having openings therein constructed and arranged to permit passage of air therethrough into contact with said clinker and to prevent passage of clinker through said openings, and means discharging air under pressure through said openings.

10. The combination with a kiln for burning cement material to form cement clinker, of a cooler receiving clinker from said kiln, said cooler including an air pervious support for the clinker, means for imparting rotational movement to said support to cause the clinker to move outwardly thereon, means adjacent the central portion of said support for receiving the clinker from the kiln and deflecting the clinker laterally onto said support, said means having openings therein constructed and arranged to permit passage of air therethrough into contact with said clinker and to prevent passage of clinker through said openings, and means discharging air under pressure through said openings and air under less pressure through said support and the clinker thereon.

ERICH OTTO VOIGTLAENDER.
JOSEPH H. HOFFMANN.